(12) United States Patent
Chavarria Garcia et al.

(10) Patent No.: US 12,187,436 B2
(45) Date of Patent: Jan. 7, 2025

(54) CENTER CONSOLE WITH PRIVACY DIVIDER FOR PASSENGER SEAT

(71) Applicants: Safran Seats USA LLC, Gainesville, TX (US); Safran Seats, Plaisir (FR)

(72) Inventors: Daniel Abraham Chavarria Garcia, Chihuahua (MX); Juan Carlos Adib Audelo Navarro, Chihuahua (MX); Mario Gerardo Herrera Murillo, Chihuahua (MX); Raul Daniel Flores Aguirre, Versailles (FR)

(73) Assignees: Safran Seats USA LLC, Gainesville, TX (US); Safran Seats, Plaisir (FR)

( * ) Notice: Subject to any disclaimer, the term of this patent is extended or adjusted under 35 U.S.C. 154(b) by 51 days.

(21) Appl. No.: 17/926,835

(22) PCT Filed: Sep. 2, 2020

(86) PCT No.: PCT/US2020/049066
§ 371 (c)(1),
(2) Date: Nov. 21, 2022

(87) PCT Pub. No.: WO2021/251999
PCT Pub. Date: Dec. 16, 2021

(65) Prior Publication Data
US 2023/0348064 A1 Nov. 2, 2023

Related U.S. Application Data

(60) Provisional application No. 63/038,521, filed on Jun. 12, 2020.

(51) Int. Cl.
*B60N 2/90* (2018.01)
*B64D 11/06* (2006.01)
(Continued)

(52) U.S. Cl.
CPC ............ *B64D 11/0606* (2014.12); *B60N 2/28* (2013.01); *B60N 2/90* (2018.02); *B60N 2/91* (2018.02); *B60R 21/026* (2013.01); *B60R 21/06* (2013.01)

(58) Field of Classification Search
CPC ......... B60R 21/026; B60R 21/06; B60N 2/91; B60N 2/28; B60N 2/90; B64D 1/0606
See application file for complete search history.

(56) References Cited

U.S. PATENT DOCUMENTS 5,704,685 A * 1/1998 Handa .................... B60N 2/882
297/238
8,973,985 B2 * 3/2015 Arakawa .................. B60N 2/64
297/112
(Continued)

FOREIGN PATENT DOCUMENTS

EP 2554430 A1 2/2013
EP 3572325 A1 11/2019
(Continued)

OTHER PUBLICATIONS

International Patent Application No. PCT/US2020/049066, International Search Report and Written Opinion, dated Mar. 3, 2021.

*Primary Examiner* — Syed A Islam
(74) *Attorney, Agent, or Firm* — Kilpatrick Townsend & Stockton LLP

(57) ABSTRACT

Described is a passenger seat having a seat bottom, a seat back, and a privacy divider. The seat back may have a stationary portion and a moveable portion, wherein the moveable portion is substantially upright in stowed position and is substantially horizontal over the seat bottom in a deployed position. The privacy divider may be coupled to at least an upper surface of the moveable portion in the deployed position.

17 Claims, 7 Drawing Sheets

(51) Int. Cl.
*B60N 2/28* (2006.01)
*B60R 21/02* (2006.01)
*B60R 21/06* (2006.01)

(56) References Cited

U.S. PATENT DOCUMENTS

| 10,086,724 B2 * | 10/2018 | Geraty ................... B60N 2/90 |
| 2013/0197764 A1 | 8/2013 | Thomas |
| 2014/0132040 A1 | 5/2014 | Arakawa et al. |
| 2016/0355109 A1 | 12/2016 | Geraty |

FOREIGN PATENT DOCUMENTS

| JP | H0681822 U | 11/1994 |
| WO | 2019089075 A1 | 5/2019 |

* cited by examiner

CENTER CONSOLE WITH PRIVACY DIVIDER FOR PASSENGER SEAT

CROSS REFERENCE TO RELATED APPLICATIONS

This application is related to and claims priority benefits from U.S. Provisional Application Ser. No. 63/038,521 ("the '521 application"), filed on Jun. 12, 2020, entitled CENTER CONSOLE PRIVACY DIVIDER AND AMENITIES FOR AIRCRAFT SEAT. The '521 application is hereby incorporated in its entirety by this reference.

FIELD OF THE INVENTION

The field of the invention relates to passenger seats, and more particularly to center consoles with deployable privacy dividers for a passenger seat.

BACKGROUND

Passenger vehicles, such as aircraft, buses, trains, ships, and automobiles, include passenger seats for passengers to sit in and utilize during travel. Some passenger seats, such as those in an economy class of an aircraft, place passengers in close proximity to one another. Thus involuntary contact between passengers is very common. For example, a passenger seat assembly in economy class may accommodate two or more passengers seated in the same row as one another. The emergence of the Coronavirus has led to an increased desire among passengers and carrier industries to inhibit the propagation of pathogens during travel, especially those spread by proximity to an infected individual.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: a seat bottom; a seat back comprising a stationary portion and a moveable portion, wherein the moveable portion is substantially upright in stowed position and is substantially horizontal over the seat bottom in a deployed position; and a privacy divider coupled to at least an upper surface of the moveable portion in the deployed position.

In some embodiments, the privacy divider is deployable when the moveable portion is in the deployed position.

In certain embodiments, the deployed privacy divider extends between the upper surface of the moveable portion in the deployed position and an upper portion of at least one of the seat back or a headrest.

The privacy divider may comprise an attachment portion that is coupleable to at least one of the seat back or a headrest, and at least one of the seat back or the headrest may define a cavity that is sized to receive the attachment portion.

The upper surface of the moveable portion in the deployed position, in some embodiments, forms a support surface usable by a passenger.

The moveable portion, in certain embodiments, is lockable in the stowed position.

In some embodiments, the moveable portion is positioned at least partially within a recess of the stationary portion when in the stowed position.

According to certain embodiments of the present invention, a row of passenger seats comprises: at least one first passenger seat comprising: a seat bottom; a seat back comprising a stationary portion and a moveable portion, wherein the moveable portion is substantially upright in stowed position and is substantially horizontal over the seat bottom in a deployed position; and a privacy divider coupled to at least an upper surface of the moveable portion in the deployed position; and at least two second passenger seats, wherein the at least one first passenger seat is positioned between the at least two second passenger seats.

In certain embodiments, the privacy divider is deployable when the moveable portion is in the deployed position.

The deployed privacy divider may extend between the upper surface of the moveable portion in the deployed position and an upper portion of at least one of the seat back or a headrest.

The privacy divider, in some embodiments, comprises an attachment portion that is coupleable to at least one of the seat back or a headrest.

At least one of the seat back or the headrest, in certain embodiments, defines a cavity that is sized to receive the attachment portion.

The upper surface of the moveable portion in the deployed position may form a support surface usable by a passenger.

In some embodiments, the moveable portion is lockable in the stowed position.

In certain embodiments, the moveable portion is positioned at least partially within a recess of the stationary portion when in the stowed position.

According to certain embodiments of the present invention, a method of deploying a moveable portion of a seat back of a passenger seat comprises: moving the moveable portion into a deployed position with the moveable portion being substantially horizontal above a seat bottom of the passenger seat, wherein a privacy divider is coupled to at least an upper surface of the moveable portion in the deployed position.

The deployed privacy divider may extend between the upper surface of the moveable portion in the deployed position and an upper portion of at least one of the seat back or a headrest.

The method, in some embodiments, further comprises coupling an attachment portion of the privacy divider to at least one of the seat back or a headrest, and wherein at least one of the seat back or the headrest defines a cavity that is sized to receive the attachment portion.

The upper surface of the moveable portion in the deployed position, in certain embodiments, forms a support surface usable by a passenger.

The method may further comprise stowing the moveable portion, wherein the moveable portion is lockable in a stowed position.

In some embodiments, the method further comprises stowing the moveable portion within a recess of a stationary portion of the seat back.

DETAILED DESCRIPTION

Figure 1A:
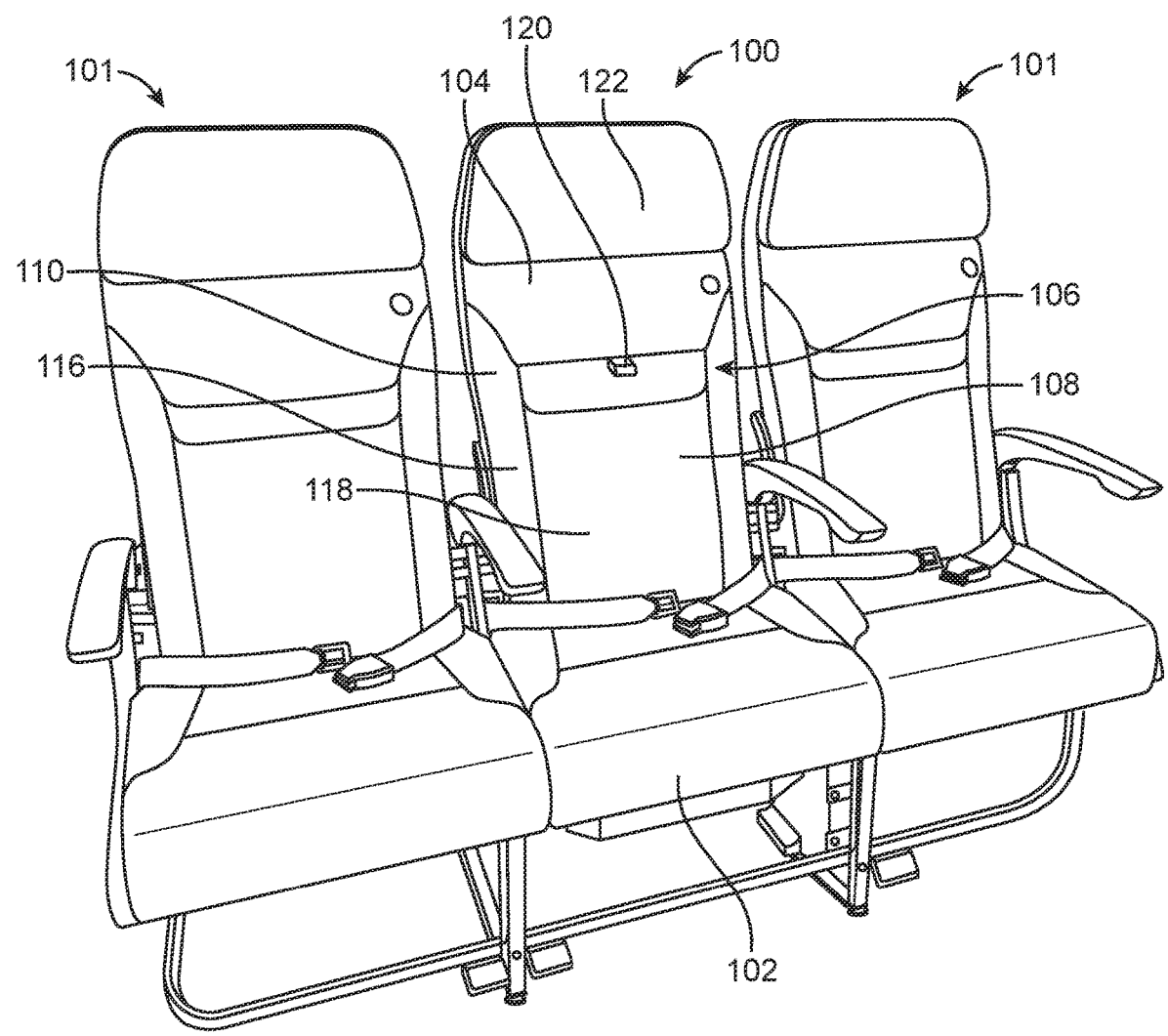
FIG. 1A is a front perspective view of a passenger seat with a center console with privacy divider positioned in a row of passenger seats, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing.

The described embodiments of the invention provide a center console with a privacy divider for passenger seats. While the center console is discussed for use with aircraft seats, it is by no means so limited. Rather, embodiments of the center console may be used in passenger seats or other seats of any type or otherwise as desired.

Passengers who travel on commercial airlines, especially those in economy seating, are accustomed to sitting in close proximity to other passengers. For example, a passenger in a middle seat of a row of three seats may have passengers sitting to their left and right as well as in rows directly forward and directly aft. In some cases, however, passengers may not be comfortable sitting in such close proximity. This may be especially true during times when rates of bacteria and virus transmission are high, such as during the Coronavirus pandemic of 2020.

To minimize rates of transmission and generally alleviate passenger concerns, it may be desirable to divide seats of a row of passenger seats with physical barriers, such as the privacy divider of the center console described herein. These physical barriers can function to keep passengers from touching each other, thereby minimizing transmission of virus via physical touch. For example, the privacy divider may be deployed between two seats in a row to keep passengers from inadvertently touching each other and/or each other's seats. These physical barriers can also function to keep respiratory droplets of certain passengers (e.g., those thought to be sick) within a predefined area, thereby minimizing transmission of virus via the air.

Embodiments of the center consoles with privacy dividers described herein may be incorporated into existing aircraft with limited cost or impact on existing procedures. Additionally, the center consoles with privacy dividers may be deployed or stowed based on the number of passengers of the passenger vehicle. If the passenger vehicle is not operating at full capacity, the center console and privacy divider may be deployed. If the passenger vehicle needs to operate at full capacity, the center console and privacy divider may be stowed without having to fully remove the center console and privacy divider from the passenger seat.

According to certain embodiments of the present invention, as shown in FIGS. 1A-5, a passenger seat 100 includes a seat bottom 102, a seat back 104, and a divider assembly 106. The seat back 104 includes a moveable portion 108, which may form the center console, and a stationary portion 110. The divider assembly 106 includes the moveable portion 108 of the seat back 104 and a privacy divider 112.

While the embodiments shown in the figures depict the passenger seat 100 positioned between additional passenger seats 101, it is understood that the passenger seat 100, which includes the divider assembly 106, may be positioned at any location within a row of passenger seats. For example, the passenger seat 100 may be the seat positioned proximate the aisle of an aircraft or may be the seat positioned proximate the window of an aircraft. In some embodiments, multiple passenger seats 100 each incorporating the divider assembly 106 may be utilized within a single row of passenger seats.

The passenger seat 100, and any features of the passenger seat 100, e.g., the seat bottom 102, the seat back 104, the moveable portion 108, the stationary portion 110, the privacy divider 112, etc., may be formed of materials including but not limited to aluminum, stainless steel, aramid fibers, polycarbonate, polypropylene, other metallic materials, composite materials, or other similar materials. Additionally, the seat bottom 102, the seat back 104, the moveable portion 108, or the stationary portion 110 may include or be at least partially covered by a cushioning material, such as foam, feathers, cotton, etc.

In general, the passenger seat 100 includes the seat bottom 102 and the seat back 104 supported relative to the seat bottom 102. Each seat back 104 and the corresponding portion of the seat bottom 102 together at least partially define a living space for the passenger when used (i.e., the space that the passenger may occupy and use while sitting in a particular passenger seat 100). The seat back 104 includes a forward-facing surface 116 and an aft-facing surface.

In some embodiments, the seat back 104 includes the moveable portion 108 and the stationary portion 110. The moveable portion 108 may be any suitable size and shape, e.g., square, rectangular, circular, semi-circular, triangular, etc., and may be located at any suitable location of the seat back 104. For example, the moveable portion 108 may be located in a substantially central location of the seat back 104. Additionally, the moveable portion 108 may be moveable, e.g., pivotable, rotatable, translatable, etc., relative to the stationary portion 110.

Figure 1B:
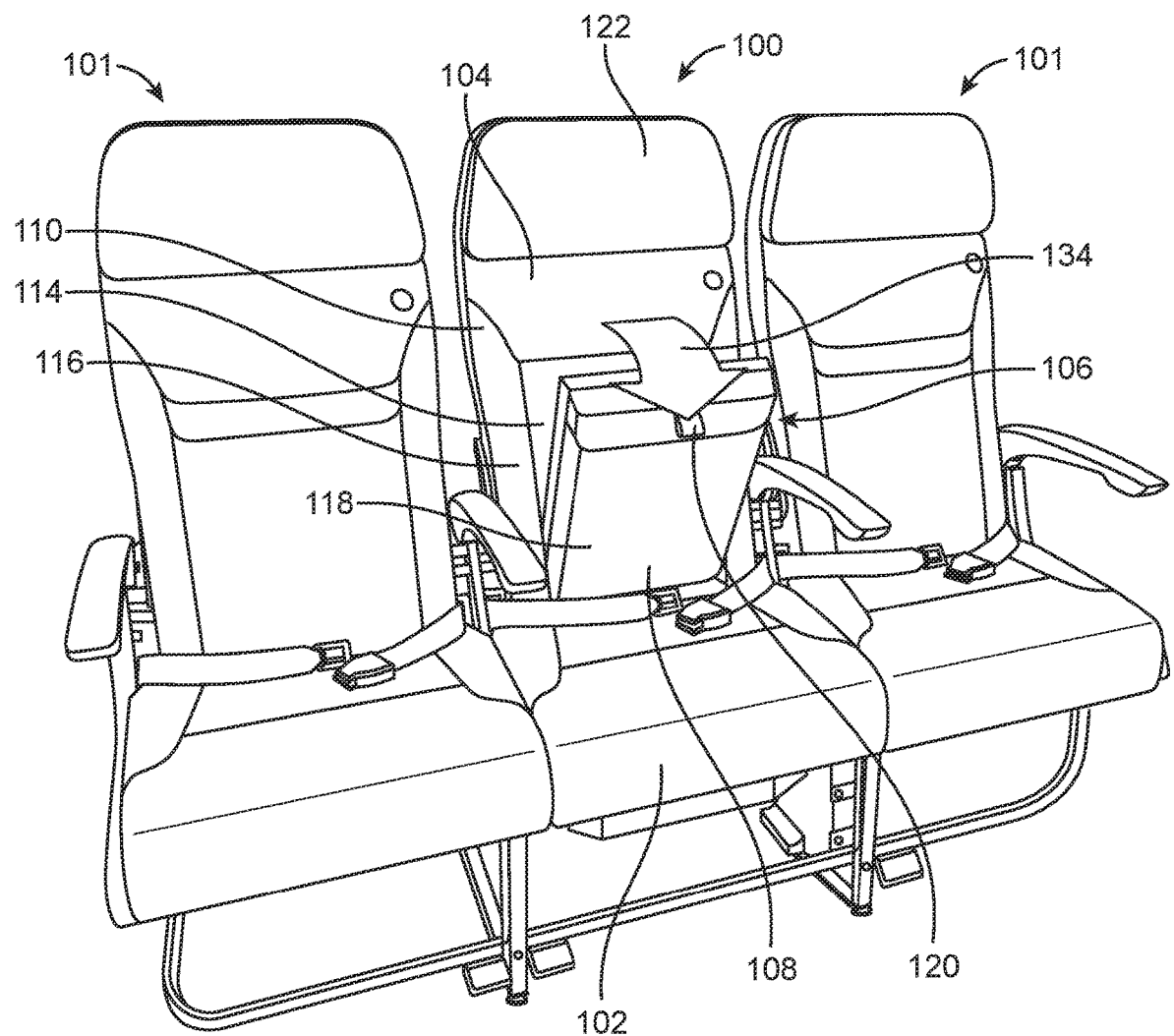
FIG. 1B is a front perspective view of the passenger seat with the center console with privacy divider of FIG. 1A, where the center console has been partially deployed.
Figure 1C:
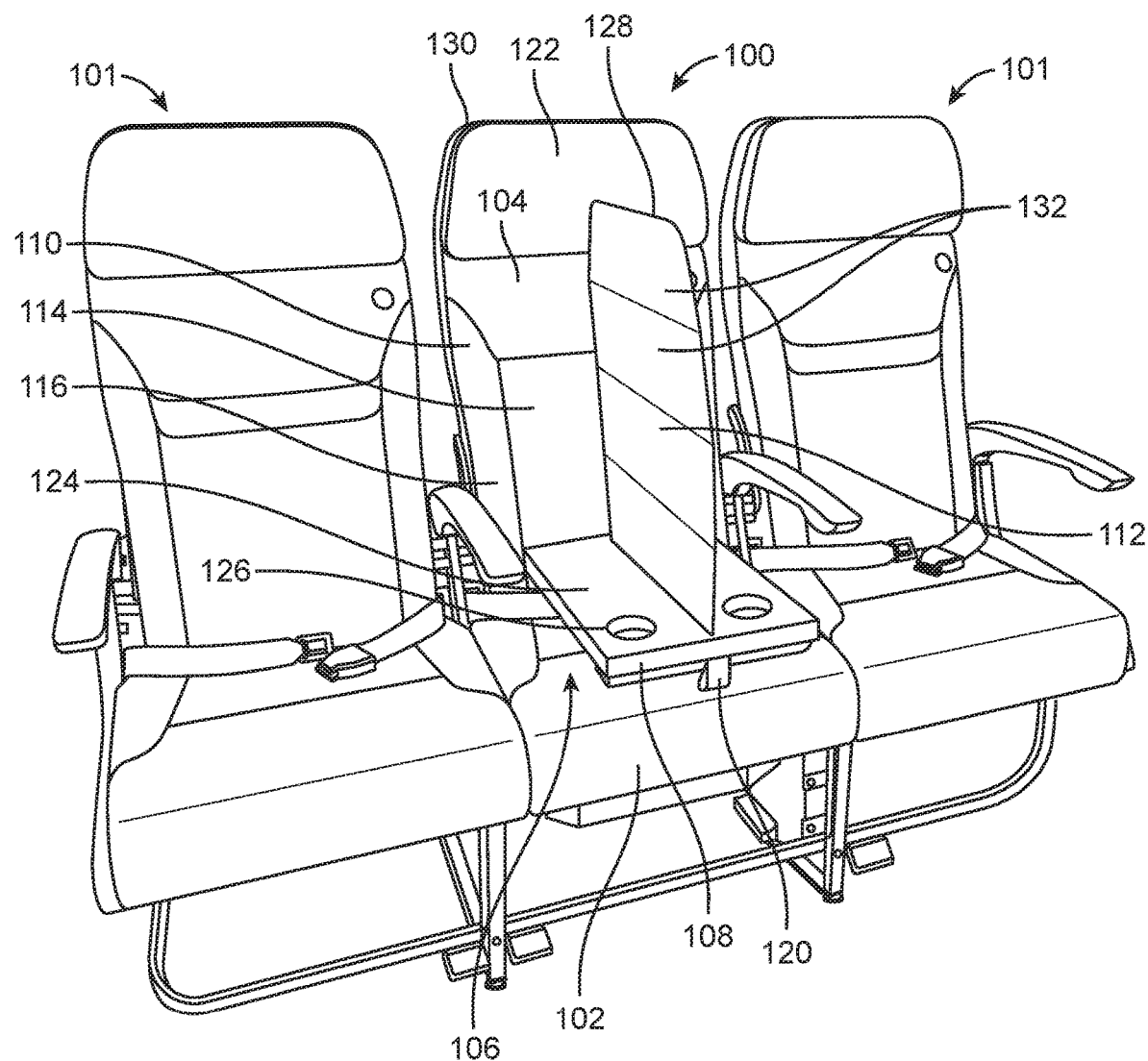
FIG. 1C is a front perspective view of the passenger seat with the center console with privacy divider of FIG. 1A, where the center console and the privacy divider have been deployed.

The moveable portion 108 may move between a stowed position, e.g., as is illustrated in FIG. 1A, and a deployed position, e.g., as is illustrated in FIGS. 1B and 1C. In the stowed position, the moveable portion 108 may be positioned in a substantially upright position. For example, the moveable portion 108 may be substantially vertical in the stowed position. In some cases, the angle of the moveable portion 108 relative to the seat bottom 102 may be substantially the same as the angle of the stationary portion 110 relative to the seat bottom 102 when the moveable portion 108 is in the stowed position.

In the deployed position, e.g., as is illustrated in FIG. 1C, the moveable portion 108 may be positioned in a substantially horizontal position and may extend at least partially above the seat bottom 102. Optionally, the moveable portion 108 may at least partially contact or rest on the seat bottom 102 in the deployed position. It should be understood that the moveable portion 108 may be positioned in any number of intermediate deployed positions between the stowed position and the deployed position.

The moveable portion 108 may be deployed based on the occupancy of the passenger vehicle. For example, when the passenger vehicle is at full capacity, the moveable portion 108 may be stowed so that a passenger may sit in the passenger seat 100. However, if the passenger vehicle is not at full capacity, the moveable portion 108 may be deployed for those passenger seats 100 not occupied by a passenger. Incorporating the moveable portion 108 means that carriers do not lose the use of the passenger seat 100, but rather can determine whether to deploy the moveable portion 108 based on the occupancy of the passenger vehicle.

In some embodiments, the stationary portion 110 of the seat back 104 may define at least one recess 114. The at least one recess 114 may be any suitable shape, e.g., square, rectangular, circular, semi-circular, triangular, etc., that corresponds to the shape of the moveable portion 108. The at least one recess 114 may extend from the forward-facing surface 116 into the seat back 104 without extending through to the aft-facing surface. The at least one recess 114 may be sized to at least partially receive the moveable portion 108 within the recess 114. For example, the moveable portion 108 may at least partially fit within the recess 114 when in the stowed position.

In some cases, the moveable portion 108 may have a friction fit with the edges of the stationary portion 110 defining the recess 114 so that the moveable portion 108 is substantially secured to the stationary portion 110 when received within the recess 114. Applying a force, e.g., a passenger pulling on a portion of the moveable portion 108, may overcome the friction fit of the moveable portion 108 with the edges defining the recess 114 so that the moveable portion 108 is at least partially removed from the recess 114.

In some embodiments, the entirety of the moveable portion 108 fits within the recess 114 so that an outer surface 118 of the moveable portion 108 is substantially aligned with the forward-facing surface 116 of the seat back 104 when the moveable portion 108 is in the stowed position. Thus the outer surface 118 of the moveable portion 108 may at least partially form a support surface of the seat back 104 when the moveable portion 108 is in the stowed position. The support surface of the seat back 104 may be formed from the outer surface 118 of the moveable portion 108 as well as the forward-facing surface 116 of the seat back 104. The support surface of the seat back 104 may come into contact with a passenger when the passenger is seated in the passenger seat 100.

The moveable portion 108 may be coupled with the stationary portion 110 at any suitable location to permit movement of the moveable portion 108 relative to the stationary portion 110. For example, the moveable portion 108 may be coupled to the stationary portion 110 at a lower portion of the seat back 104 proximate the seat bottom 102 or at a more central location proximate an armrest of the passenger seat 100. In some embodiments, the moveable portion 108 may be coupled to the edges of the stationary portion 110 that define the recess 114. Optionally, the moveable portion 108 may be coupled with other elements of the passenger seat 100, e.g., the seat back 104, the armrest, the seat bottom 102, a seat frame, etc.

In some embodiments, the moveable portion 108 may be coupled with the stationary portion 110, or any other suitable element of the passenger seat 100, using a hinge mechanism, a pivot mechanism, or any other suitable mechanism. This coupling permits the moveable portion 108 to be pivotable relative to the stationary portion 110. The pivoting movement of the moveable portion 108 is represented by arrow 134.

At least one of the moveable portion 108 or the stationary portion 110 may include a locking mechanism, e.g., a lock, a latch, or any other suitable device that may secure the moveable portion 108 to the stationary portion 110 when the moveable portion 108 is in the stowed position and prevent movement of the moveable portion 108 when the moveable portion 108 is in the stowed position. The locking mechanism may be positioned at least partially within an interior of the moveable portion 108 or the stationary portion 110. In some embodiments, an activation member 120 may be accessible on an exterior portion of the moveable portion 108 or the stationary portion 110 and may cause the locking mechanism to change lock states. For example, the activation member 120 may be a lever, a button, a pull tab, or any other device suitable for changing the locking mechanism from a locked state to an unlocked state.

The passenger seat 100 may also include a headrest 122. In some embodiments, such as those illustrated in FIGS. 2A-2B and 4-5, the headrest 122 may be integrally formed with the seat back 104. In further embodiments, such as those illustrated in FIGS. 1A-1C and 3, the headrest 122 may be a separate element that is coupled to a portion of the seat back 104. The headrest 122 may be moveably coupled to the seat back 104 such that the headrest 122 is pivotable, rotatable, translatable, etc. relative to the seat back 104.

In some embodiments, as illustrated in FIGS. 1C and 2B-5, the moveable portion 108 may have an upper surface 124 that is substantially horizontal when the moveable portion 108 is in the deployed position. The upper surface 124 may form a usable surface that may be utilized by the passenger, e.g., the passenger may place various personal or food items on the upper surface 124. Optionally, the upper surface 124 may include personal electronic device ("PED") holders or cup holders 126. Thus the upper surface 124 may provide the passenger with additional living space and/or amenities.

As discussed above, the moveable portion 108 may be part of the divider assembly 106. In some embodiments, the divider assembly 106 also includes the privacy divider 112. The privacy divider 112 may be utilized to reduce the transmission of airborne particles from passenger to passenger, to reduce involuntary contact between passengers, and/or to otherwise define individual personal space for the passengers using the additional passenger seats 101.

The privacy divider 112 may be constructed from various materials suitable for movement between the stowed position and the deployed position. In some embodiments, the privacy divider 112 may be formed from at least one rigid material, including but not limited to various metals, plastics, composites, combinations thereof, or other suitable materials as desired. In further embodiments, the privacy divider 112 may be formed from at least one non-rigid material, including but not limited to various knitted material, woven material, non-woven material, foil, combinations thereof, or other suitable materials as desired. Optionally, the privacy divider 112 is formed from both rigid and non-rigid materials.

In some embodiments, the privacy divider 112 is coupled to, or at least extends from, the upper surface 124 of the moveable portion 108. The privacy divider 112 may be coupled to any suitable location on the upper surface 124. For example, the privacy divider 112 may be coupled to the upper surface 124 along a longitudinal axis of the moveable portion 108 that runs substantially perpendicular to the seat back 104.

The privacy divider 112 may be moveable between a stowed position and a deployed position. In the deployed position, the privacy divider 112 may extend in a substantially vertical direction. In some embodiments, the privacy divider 112 may extend from the upper surface 124 to an upper portion of the seat back 104. For example, the privacy divider 112 may extend such that an upper edge 128 of the privacy divider 112 is located above an upper edge 130 of the seat back 104, may extend such that the upper edge 128 is substantially even with the upper edge 130, or may extend such that the upper edge 128 is located below the upper edge 130.

In the deployed position, the privacy divider 112 may at least partially enclose the living space of the additional passenger seats 101 and/or may provide a partial barrier between the additional passenger seats 101. In some embodiments, the privacy divider 112 may extend to a sufficient height so as to provide a barrier between the faces of the passengers seated in the additional passenger seats 101.

In some embodiments, such as is illustrated in FIG. 1C, the privacy divider 112 may have a foldable structure with panels 132 (only two of which are labelled). When the privacy divider 112 is in the stowed position, the panels 132 are folded relative to one another and rest on top of one another in a substantially flat position on the upper surface 124 when the moveable portion 108 is in the deployed position. The stowed privacy divider 112 may be positioned between the upper surface 124 and a surface of the seat back 104 when the moveable portion 108 is in the stowed position. For example, the stowed privacy divider 112 may be positioned between the upper surface 124 and a forward-facing surface 116 of the stationary portion 110 that defines the recess 114.

To deploy the privacy divider 112, a passenger, crew member, or other suitable individual may raise the uppermost panel 132 until the privacy divider 112 is fully extended, e.g., until the panels 132 are substantially aligned.

In some embodiments, a portion of one or more of the panels 132 may be coupled to a portion of the seat back 104 so that the privacy divider 112 maintains the deployed position. Optionally, the privacy divider 112 may maintain the deployed position without any attachment to the seat back 104.

Figure 2A:
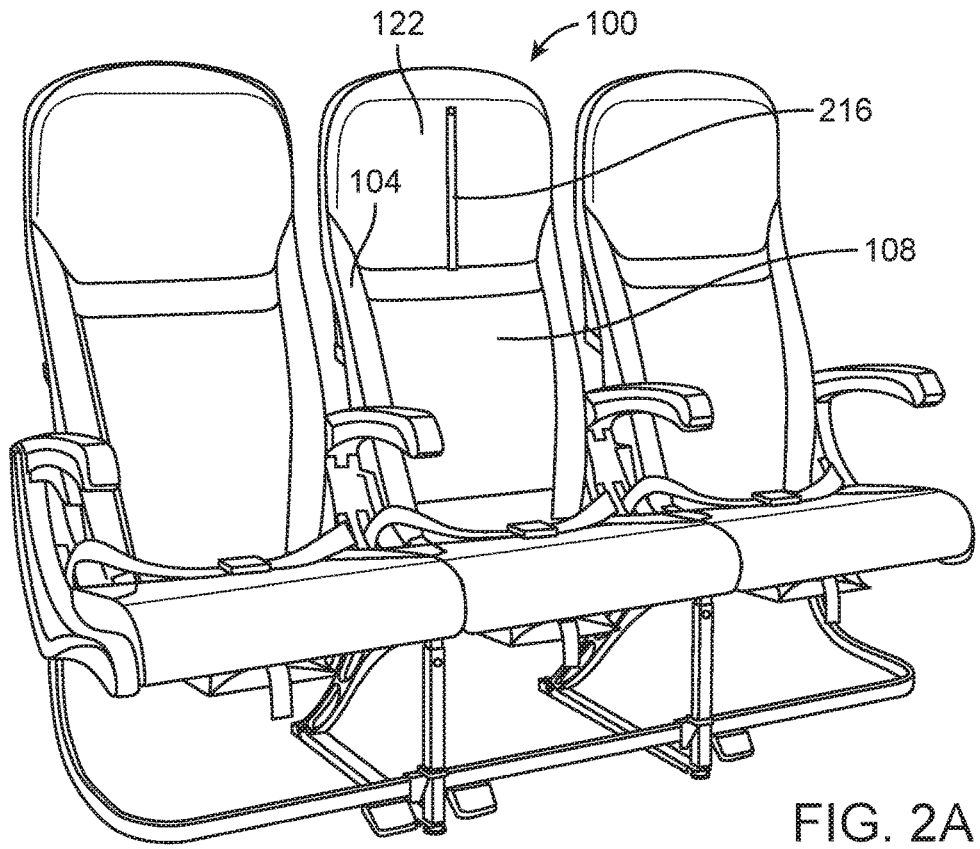
FIG. 2A is a front perspective view of a passenger seat with a center console with privacy divider positioned in a row of passenger seats, according to certain embodiments of the present invention.
Figure 2B:
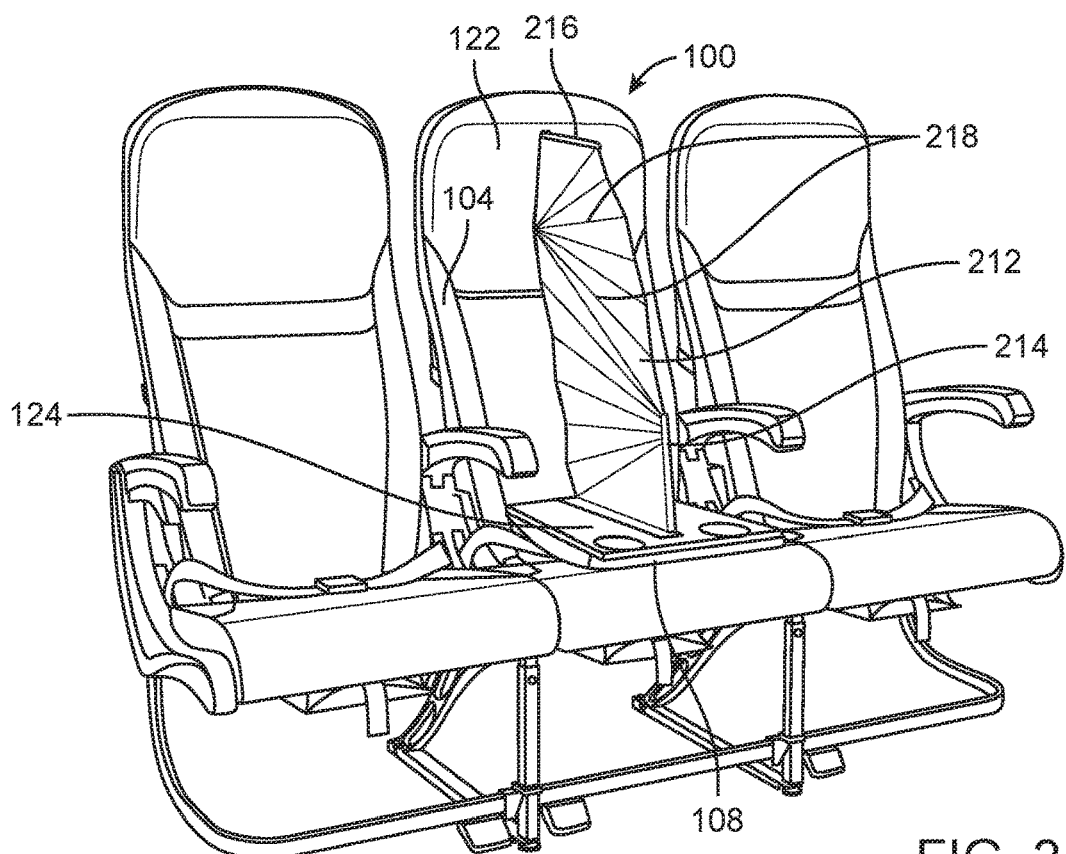
FIG. 2B is a front perspective view of the passenger seat with the center console with privacy divider of FIG. 2A, where the center console and the privacy divider have been deployed.

In some embodiments, such as best illustrated in FIGS. 2A and 2B, the passenger seat 100 may include a privacy divider 212. The passenger seat 100 and the privacy divider 212 described in reference to FIGS. 2A and 2B may be the same as or similar to the passenger seat 100 and privacy divider 112, respectively, described above in reference to FIGS. 1A-1C.

The privacy divider 212 may have an origami-type foldable structure. This origami-type foldable structure may include folds 218 (only two of which are labelled) that assist with the deployment and stowing of the privacy divider 212. In some embodiments, the privacy divider 212 is at least partially attached to the moveable portion 108 and the headrest 122 or the seat back 104.

The privacy divider 212 may be at least partially attached to at least one deployment member 214. The deployment member 214 may be pivotally coupled to the moveable portion 108. When the privacy divider 212 is in the deployed position, the deployment member 214 extends in a direction away from the upper surface 124. Optionally, the deployment member 214 extends in a direction substantially perpendicular to the upper surface 124. When the privacy divider 212 is in the stowed position, the deployment member 214 may be positioned along or substantially parallel to the upper surface 124 of the moveable portion 108.

In some embodiments, a second deployment member 216 may be coupled to the headrest 122 or the seat back 104 of the passenger seat. A second portion of the privacy divider 212 may be at least partially attached to the second deployment member 216. The second deployment member 216 may be pivotally coupled to the headrest 122 or the seat back 104. When the privacy divider 212 is in the deployed position, the second deployment member 216 extends in a direction away from the headrest 122 or the seat back 104. Optionally, the second deployment member 216 extends in a direction substantially perpendicular to the headrest 122 or the seat back 104.

When the privacy divider 212 is in the stowed position, the second deployment member 216 may be positioned along or substantially parallel to the headrest 122 or the seat back 104. Additionally, the headrest 122 or the seat back 104 may define a channel in which the second deployment member 216 may be received when the privacy divider 212 is in the stowed position. By having the second deployment member 216 rest within the channel when the privacy divider 212 is in the stowed position, a substantially even surface may be maintained on the headrest 122 or the seat back 104.

In some embodiments, the deployment members 214, 216 may be coupled to the moveable portion 108, the headrest 122, or the seat back 104 using a spring-loaded mechanism. Thus, as the moveable portion 108 moves from the stowed position to the deployed position, the privacy divider 212 also moves from the stowed position to the deployed position without any additional interaction from a passenger, crew member, or other individual.

As previously mentioned, the folds 218 may be designed to assist with the stowing and deployment of the privacy divider 212. For example, when the moveable portion 108 is pivoted to move the moveable portion 108 from the deployed position to the stowed position, the folds 218 may enable the privacy divider 212 to fold in on itself as the moveable portion 108 moves.

Figure 3:
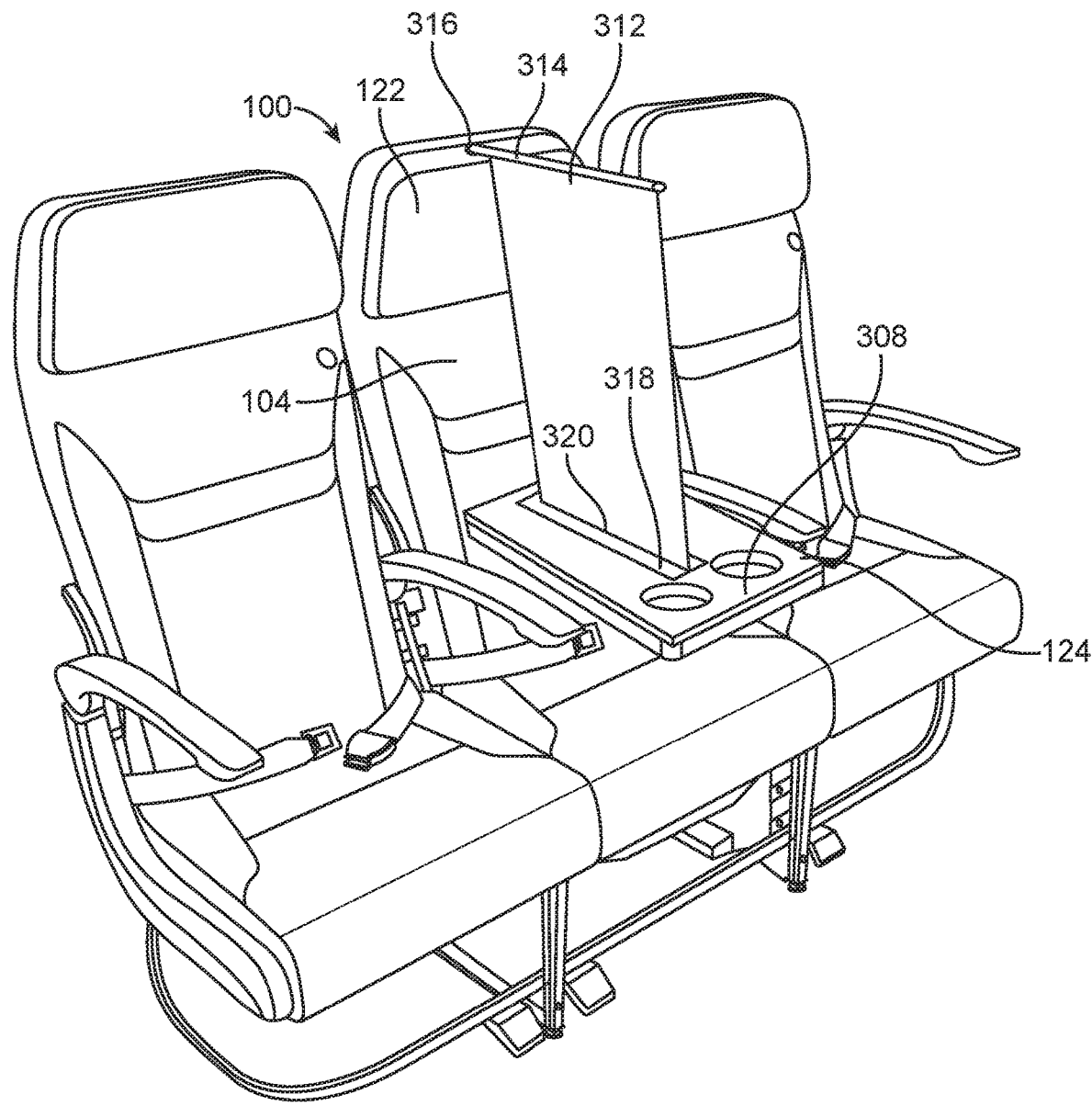
FIG. 3 is a front perspective view of a passenger seat with a center console with privacy divider positioned in a row of passenger seats, according to certain embodiments of the present invention.

In some embodiments, such as best illustrated in FIG. 3, the passenger seat 100 may include a moveable member 308 and a privacy divider 312. The passenger seat 100, the moveable member 308, and the privacy divider 312 described in reference to FIG. 3 may be the same as or similar to the passenger seat 100 and privacy divider 112, 212, respectively, described above in reference to FIGS. 1A-2B.

The privacy divider 312 may be rollable and may include a driver. The driver may be positioned wholly or partially interior to the moveable portion 108. The driver may be various suitable devices or mechanisms that support the privacy divider 312 and enable a rolling movement of the privacy divider 312 between the stowed position and a deployed position. Optionally, the driver may bias the privacy divider 312 towards the stowed position or the deployed position. In one non-limiting example, the driver may be a spring drive that biases the privacy divider 312 towards the stowed position. In such examples, a force may be required (e.g., from the passenger) to move the privacy divider 312 from the stowed position to the deployed position, and the driver may automatically retract the privacy divider 312 when the force is removed and/or if the privacy divider 112 is not otherwise secured in the deployed position.

In some embodiments, the privacy divider 312 includes a deployment member 314. The deployment member 314 may be used to assist with the deployment of the privacy divider 312. For example, a passenger, crew member, or other individual may move the deployment member 314 away from the upper surface 124 of the moveable member 308 to deploy the privacy divider 312.

The particular shape of the deployment member 314 should not be considered limiting on the disclosure as the deployment member 314 may have various other shapes or profiles as desired. For example, the deployment member 314 may be an elongated plastic rod attached to the privacy divider 312. In certain aspects, the deployment member 314 is rigid relative to the privacy divider 312, although it need not be in other examples. The deployment member 314 may be constructed from various suitable materials as desired, including but not limited to various metals, plastics, composites, combinations thereof, or other materials as desired.

To maintain the privacy divider 312 in the deployed position, a portion of the deployment member 314 may be inserted into a cavity 316 defined by the headrest 122 or the seat back 104. Optionally, the cavity 316 may be positioned on the seat back 104 such that it is covered by the headrest 122. In such cases, the headrest 122 may be moved to reveal the cavity 316 so that the deployment member 314 may be inserted into the cavity 316.

Optionally, the moveable member 308 includes a divider cover 318. In certain aspects, the divider cover 318 may house the driver, and the divider cover 318 may at least partially house the privacy divider 312 when the privacy divider 312 is in the stowed position. The divider cover 318 may be constructed from various materials as desired. In some embodiments, the divider cover 318 optionally defines a deployment slot 320 that the privacy divider 312 may extend through such that the privacy divider 312 may be moved between the stowed position and the deployed position.

Figure 4:
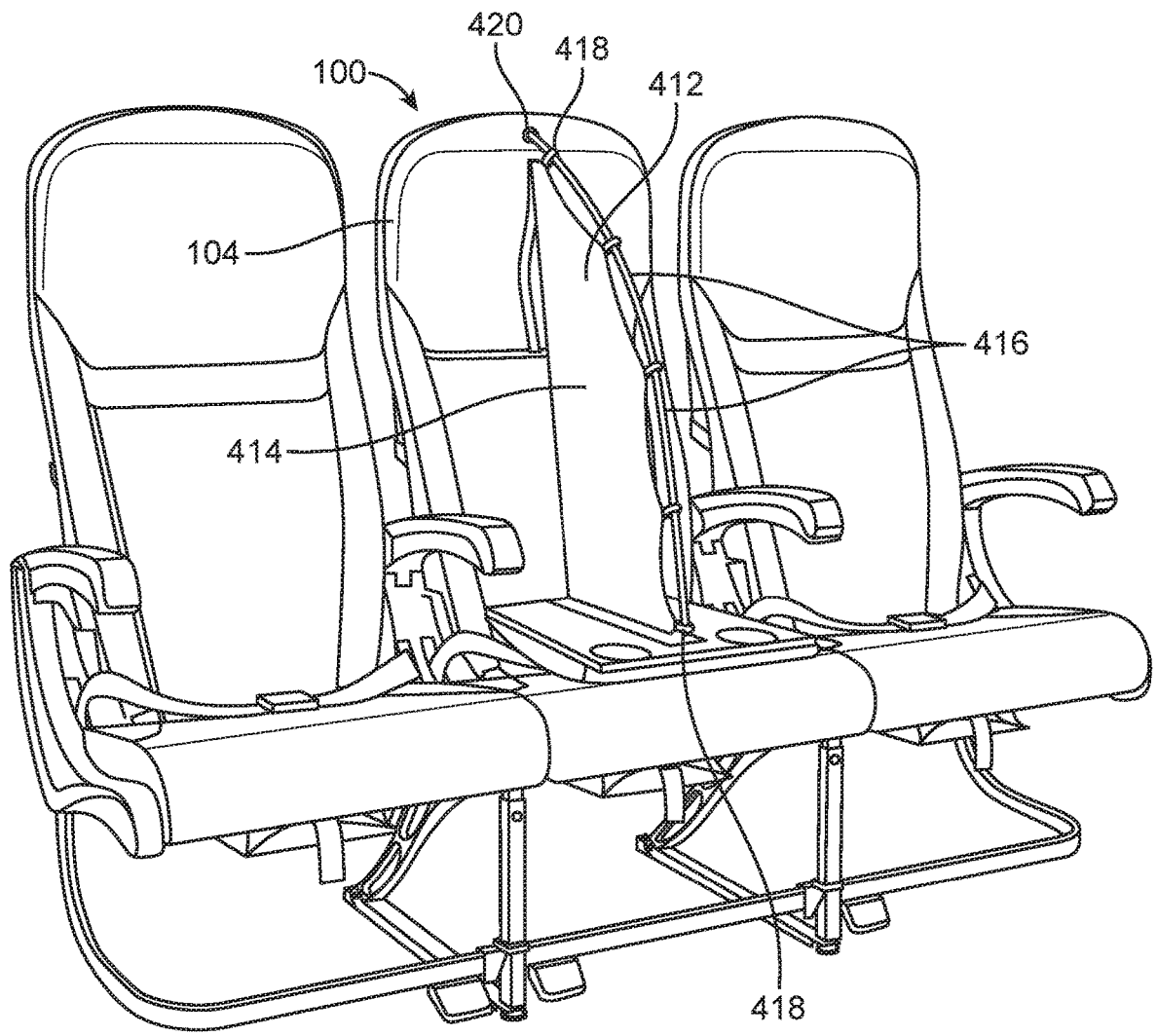
FIG. 4 is a front perspective view of a passenger seat with a center console with privacy divider positioned in a row of passenger seats, according to certain embodiments of the present invention.

In some embodiments, such as best illustrated in FIG. 4, the passenger seat 100 may include a privacy divider 412. The passenger seat 100 and the privacy divider 412 described in reference to FIG. 4 may be the same as or similar to the passenger seat 100 and privacy divider 112, 212, 312 respectively, described above in reference to FIGS. 1A-3.

The privacy divider 412 may be formed of a non-rigid material 414 and multiple inter-connecting rods 416 (only two of which are labelled). The non-rigid material 414 may be coupled with the inter-connecting rods 416 via fasteners 418, e.g., hooks, rings, etc. To deploy the privacy divider 412, the individual inter-connecting rods 416 may be connected to one another and inserted into a cavity 420 in the seat back 104. The fasteners 418 may then be moved along the connected inter-connected rods 416 to fully extend the non-rigid material 414.

Figure 5:
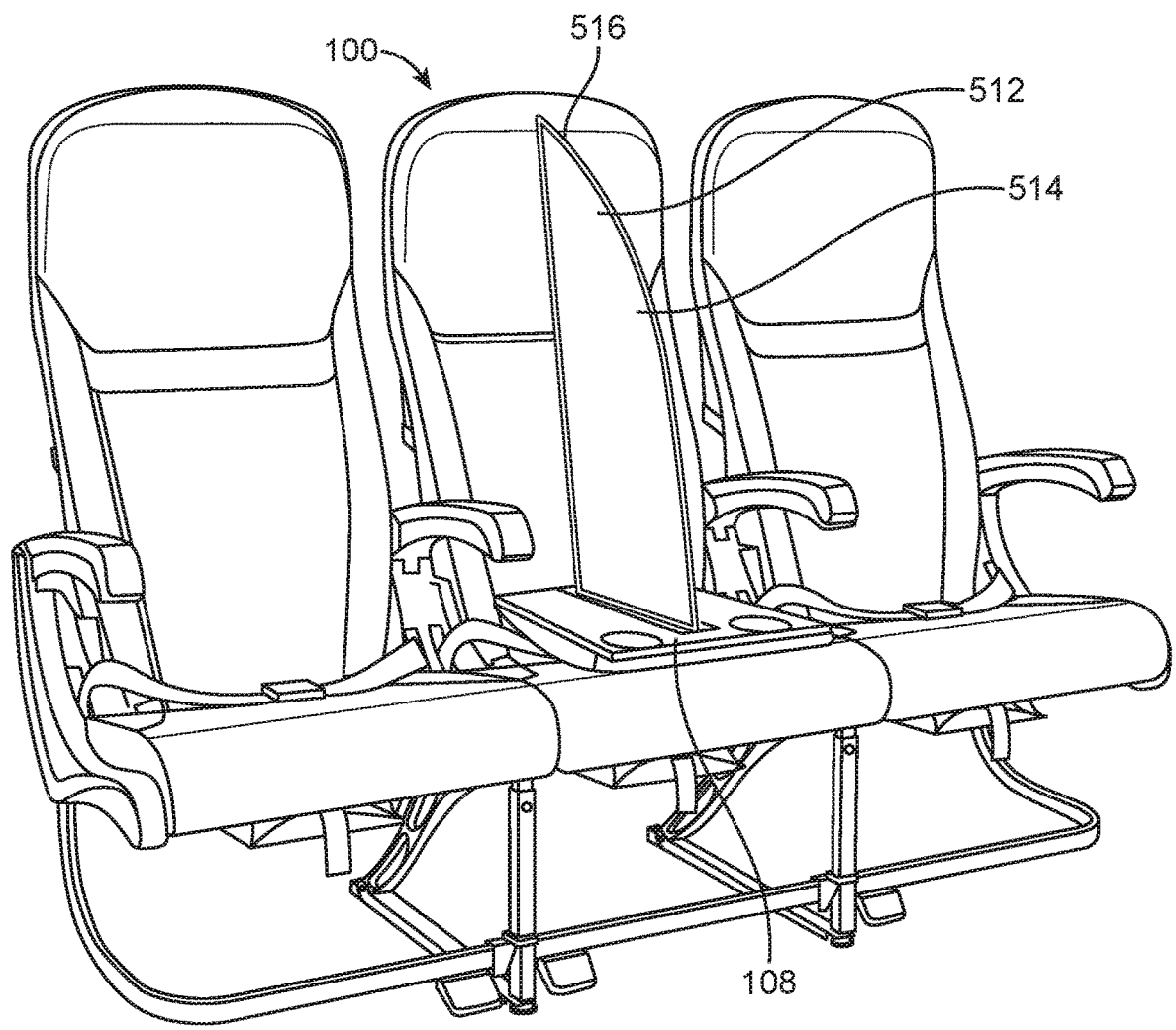
FIG. 5 is a front perspective view of a passenger seat with a center console with privacy divider positioned in a row of passenger seats, according to certain embodiments of the present invention.

In some embodiments, such as best illustrated in FIG. 5, the passenger seat 100 may include a privacy divider 512. The passenger seat 100 and the privacy divider 512 described in reference to FIG. 5 may be the same as or similar to the passenger seat 100 and privacy divider 112, 212, 312, 412 respectively, described above in reference to FIGS. 1A-4.

The privacy divider 512 may be formed from a non-rigid material 514 that is coupled to and at least partially surrounded by a flexible support 516. The flexible support 516 may be a metal, plastic, or any other suitable material that is bendable while having enough structure to support the privacy divider 512 in the deployed position. The flexible support 516 may have spring-like properties that cause the flexible support 516 to return to its original shape after being bent. In some embodiments, the privacy divider 512 will automatically deploy, e.g., without further interaction from a passenger, crew member, or other individual, as the moveable portion 108 is deployed. This automatic deployment occurs due to the spring-like properties of the flexible support 516.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1. A passenger seat (which may incorporate features of any of the subsequent examples) comprising: a seat bottom; a seat back comprising a stationary portion and a moveable portion, wherein the moveable portion is substantially upright in stowed position and is substantially horizontal over the seat bottom in a deployed position; and a privacy divider coupled to at least an upper surface of the moveable portion in the deployed position.

Example 2. The passenger seat of Example 1 or any of the preceding or subsequent examples, wherein the privacy divider is deployable when the moveable portion is in the deployed position.

Example 3. The passenger seat of Example 2 or any of the preceding or subsequent examples, wherein the deployed privacy divider extends between the upper surface of the moveable portion in the deployed position and an upper portion of at least one of the seat back or a headrest.

Example 4. The passenger seat of Example 1 or any of the preceding or subsequent examples, wherein the privacy divider comprises an attachment portion that is couple-able to at least one of the seat back or a headrest, and wherein at least one of the seat back or the headrest defines a cavity that is sized to receive the attachment portion.

Example 5. The passenger seat of Example 1 or any of the preceding or subsequent examples, wherein the upper surface of the moveable portion in the deployed position forms a support surface usable by a passenger.

Example 6. The passenger seat of Example 1 or any of the preceding or subsequent examples, wherein the moveable portion is lockable in the stowed position.

Example 7. The passenger seat of Example 1 or any of the preceding or subsequent examples, wherein the moveable portion is positioned at least partially within a recess of the stationary portion when in the stowed position.

Example 8. A row of passenger seats (which may incorporate features of any of the preceding or subsequent examples) comprising: at least one first passenger seat comprising: a seat bottom; a seat back comprising a stationary portion and a moveable portion, wherein the moveable portion is substantially upright in stowed position and is substantially horizontal over the seat bottom in a deployed position; and a privacy divider coupled to at least an upper surface of the moveable portion in the deployed position; and at least two second passenger seats, wherein the at least one first passenger seat is positioned between the at least two second passenger seats.

Example 9. The row of passenger seats of Example 8 or any of the preceding or subsequent examples, wherein the privacy divider is deployable when the moveable portion is in the deployed position.

Example 10. The row of passenger seats of Example 9 or any of the preceding or subsequent examples, wherein the deployed privacy divider extends between the upper surface of the moveable portion in the deployed position and an upper portion of at least one of the seat back or a headrest.

Example 11. The row of passenger seats of Example 8 or any of the preceding or subsequent examples, wherein the privacy divider comprises an attachment portion that is coupleable to at least one of the seat back or a headrest, and wherein at least one of the seat back or the headrest defines a cavity that is sized to receive the attachment portion.

Example 12. The row of passenger seats of Example 8 or any of the preceding or subsequent examples, wherein the upper surface of the moveable portion in the deployed position forms a support surface usable by a passenger.

Example 13. The row of passenger seats of Example 8 or any of the preceding or subsequent examples, wherein the moveable portion is lockable in the stowed position.

Example 14. The row of passenger seats of Example 8 or any of the preceding or subsequent examples, wherein the moveable portion is positioned at least partially within a recess of the stationary portion when in the stowed position.

Example 15. A method of deploying a moveable portion of a seat back of a passenger seat (which may incorporate features of any of the preceding or subsequent examples), the method comprising: moving the moveable portion into a deployed position with the moveable portion being substantially horizontal above a seat bottom of the passenger seat, wherein a privacy divider is coupled to at least an upper surface of the moveable portion in the deployed position.

Example 16. The method of Example 15 or any of the preceding or subsequent examples, further comprising deploying the privacy divider, wherein the deployed privacy divider extends between the upper surface of the moveable portion in the deployed position and an upper portion of at least one of the seat back or a headrest.

Example 17. The method of Example 15 or any of the preceding or subsequent examples, further comprising coupling an attachment portion of the privacy divider to at least one of the seat back or a headrest, and wherein at least one of the seat back or the headrest defines a cavity that is sized to receive the attachment portion.

Example 18. The method of Example 15 or any of the preceding or subsequent examples, wherein the upper surface of the moveable portion in the deployed position forms a support surface usable by a passenger.

Example 19. The method of Example 15 or any of the preceding or subsequent examples, further comprising stowing the moveable portion, wherein the moveable portion is lockable in a stowed position.

Example 20. The method of Example 15 or any of the preceding examples, further comprising stowing the moveable portion within a recess of a stationary portion of the seat back.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
a headrest portion;
a seat bottom;
a seat back comprising a stationary portion and a moveable portion, wherein the moveable portion is substantially upright in stowed position and is substantially horizontal over the seat bottom in a deployed position; and
a privacy divider coupled to at least an upper surface of the moveable portion in the deployed position and moveable between a stowed state and a deployed state; and
wherein, in the deployed state, the privacy divider extends between the upper surface of the moveable portion in the deployed position and the headrest portion; and
wherein the privacy divider comprises an attachment portion that is coupleable to the headrest portion, and wherein the headrest portion defines a cavity that is sized to receive the attachment portion.

2. The passenger seat of claim 1, wherein the privacy divider is deployable when the moveable portion is in the deployed position.

3. The passenger seat of claim 1, wherein, in the stowed position of the moveable portion, the privacy divider is in the stowed state and arranged between at least a portion of the moveable portion and a portion of the seat back.

4. The passenger seat of claim 1, wherein the upper surface of the moveable portion in the deployed position forms a support surface usable by a passenger.

5. The passenger seat of claim 1, wherein the moveable portion is lockable in the stowed position.

6. The passenger seat of claim 1, wherein the moveable portion is positioned at least partially within a recess of the stationary portion when in the stowed position.

7. A row of passenger seats comprising:
- at least one first passenger seat comprising:
  - a headrest portion;
  - a seat bottom;
  - a seat back comprising a stationary portion and a moveable portion, wherein the moveable portion is substantially upright in stowed position and is substantially horizontal over the seat bottom in a deployed position; and
  - a privacy divider coupled to at least an upper surface of the moveable portion in the deployed position and moveable between a stowed state and a deployed state;
  - wherein the privacy divider comprises an attachment portion that is coupleable to the headrest portion, and wherein the headrest portion defines a cavity that is sized to receive the attachment portion; and
  - wherein, in the deployed state, the privacy divider extends between the upper surface of the moveable portion in the deployed position and the headrest portion; and
- at least two second passenger seats, wherein the at least one first passenger seat is positioned between the at least two second passenger seats.

8. The row of passenger seats of claim 7, wherein the privacy divider is deployable when the moveable portion is in the deployed position.

9. The row of passenger seats of claim 7, wherein, in the stowed position of the moveable portion, the privacy divider is in the stowed state and arranged between at least a portion of the moveable portion and a portion of the seat back.

10. The row of passenger seats of claim 7, wherein the upper surface of the moveable portion in the deployed position forms a support surface usable by a passenger.

11. The row of passenger seats of claim 7, wherein the moveable portion is lockable in the stowed position.

12. The row of passenger seats of claim 7, wherein the moveable portion is positioned at least partially within a recess of the stationary portion when in the stowed position.

13. A method of deploying a moveable portion of a seat back of a passenger seat, the method comprising:
- moving the moveable portion into a deployed position, wherein the moveable portion is substantially horizontal above a seat bottom of the passenger seat in the deployed position; and
- coupling an attachment portion of a privacy divider to a headrest portion;
- wherein the privacy divider is coupled to at least an upper surface of the moveable portion in the deployed position and moveable between a stowed state and a deployed state; and
- wherein, in the deployed state, the privacy divider extends between the upper surface of the moveable portion in the deployed position and the headrest portion; and
- wherein the headrest portion defines a cavity that is sized to receive the attachment portion.

14. The method of claim 13, further comprising stowing the privacy divider and the moveable portion, wherein the privacy divider is arranged between at least a portion of the moveable portion and a portion of the seat back.

15. The method of claim 13, wherein the upper surface of the moveable portion in the deployed position forms a support surface usable by a passenger.

16. The method of claim 13, further comprising stowing the moveable portion, wherein the moveable portion is lockable in a stowed position.

17. The method of claim 13, further comprising stowing the moveable portion within a recess of a stationary portion of the seat back.

* * * * *